United States Patent
Uchida

(10) Patent No.: US 8,423,233 B2
(45) Date of Patent: Apr. 16, 2013

(54) DEGRADATION DETERMINING APPARATUS FOR POWER STORAGE DEVICE AND DEGRADATION DETERMINING METHOD FOR POWER STORAGE DEVICE

(75) Inventor: Masatoshi Uchida, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 951 days.

(21) Appl. No.: 12/499,150

(22) Filed: Jul. 8, 2009

(65) Prior Publication Data
US 2010/0010704 A1  Jan. 14, 2010

(30) Foreign Application Priority Data
Jul. 11, 2008  (JP) ............................ JP2008-181525

(51) Int. Cl.
G01M 17/00   (2006.01)
G06F 7/00    (2006.01)
G06F 11/30   (2006.01)

(52) U.S. Cl.
USPC ....... 701/29.9; 701/30.4; 701/30.8; 701/30.9; 701/31.1; 701/31.2

(58) Field of Classification Search .......... 324/426–434; 705/1.1; 701/29.1–32.1, 34.2–34.4
See application file for complete search history.

(56) References Cited

U.S. PATENT DOCUMENTS
6,836,122 B2   12/2004   Tojima
2009/0326749 A1   12/2009   Uchida

FOREIGN PATENT DOCUMENTS
| | | |
|---|---|---|
| EP | 2048762 A1 | 4/2009 |
| EP | 2065718 A1 | 6/2009 |
| JP | 5227669 | 9/1993 |
| JP | 9007642 | 1/1997 |
| JP | 2002101571 | 4/2002 |
| JP | 2002247710 A | 8/2002 |
| JP | 2004-022183 A | 1/2004 |
| JP | 2004271342 A | 9/2004 |
| JP | 2006197765 A | 7/2006 |
| JP | 2007195312 A | 8/2007 |
| JP | 2008083022 A | 4/2008 |
| JP | 2008126788 | 6/2008 |

OTHER PUBLICATIONS
Office Action for German Application No. 10-2009-027-594.0-35 dated Jan. 28, 2011 with translation; Applicant: Toyota Jidosha Kabushiki Kaisha.
Notice of Grounds of Rejection; JP2008-181525; May 13, 2010.
Decision to Grant Patent; JP2008-181525; Nov. 9, 2010.

*Primary Examiner* — Khoi Tran
*Assistant Examiner* — Bhavesh V Amin
(74) *Attorney, Agent, or Firm* — Gifford, Krass, Sprinkle, Anderson & Citkowski, P.C.

(57) ABSTRACT

A vehicle identifying unit obtains an identification number of a vehicle from the vehicle. A first evaluation unit evaluates a degradation state of a power storage device based on the use history of the power storage device obtained from the vehicle, using data analyzed beforehand concerning the relation between the use history and the degradation state of the power storage device. A second evaluation unit evaluates a degradation state of the power storage device using data collected when the power storage device of the vehicle is charged from a power station or when power is fed from the vehicle to the power station. A degradation determining unit determines the degradation state of the power storage device based on the degradation states evaluated by the first and second evaluation units.

8 Claims, 7 Drawing Sheets

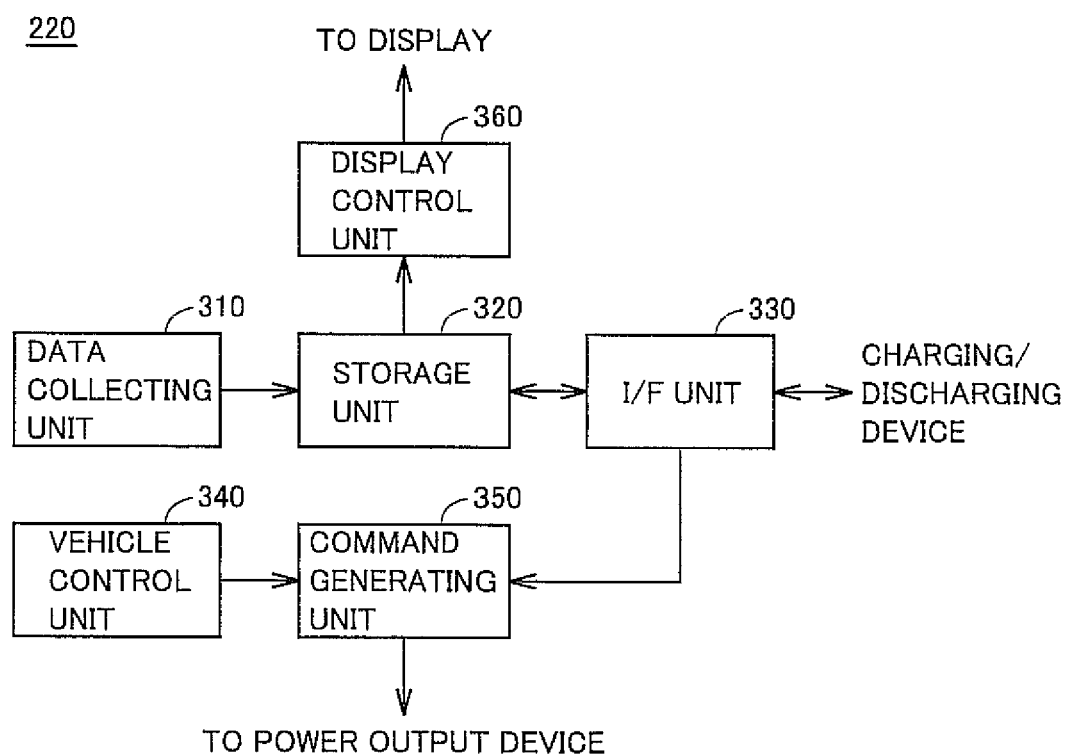

DEGRADATION DETERMINING APPARATUS FOR POWER STORAGE DEVICE AND DEGRADATION DETERMINING METHOD FOR POWER STORAGE DEVICE

This nonprovisional application is based on Japanese Patent Application No. 2008-181525 filed on Jul. 11, 2008 with the Japan Patent Office, the entire contents of which are hereby incorporated by reference.

BACKGROUND OF THE INVENTION

1. Field of the Invention

The present invention relates to a degradation determining apparatus for a power storage device and a degradation determining method for a power storage device, and more particularly to a technique of determining a degradation state of a power storage device mounted on a vehicle for driving.

2. Description of the Background Art

Japanese Patent Laying-Open No. 9-7642 discloses a charger having a function of diagnosing and determining abnormality and performance degradation of a secondary battery. This charger has three operation modes, namely, a charging mode, a refresh mode, and a diagnosis mode. In this charger, when a secondary battery is new or as good as new, charging and discharging is once performed in the diagnosis mode, and the charging capacity, the discharging capacity, and the terminal voltage at the time of completion of charging are stored in a storage unit. Then, after the secondary battery is used multiple times, the charging capacity, the discharging capacity, and the terminal voltage at the time of completion of charging are measured again in the diagnosis mode and compared with the data for the new battery stored in the storage unit in order to determine the degree of degradation.

In the charger disclosed in Japanese Patent Laying-Open No. 9-7642, however, a degradation state of a secondary battery is determined by measuring a state for a new secondary battery to be diagnosed for storage into the storage unit and measuring a state again for comparison with that of the new one after the secondary battery is used multiple times. Therefore, the degradation state can be determined only with the particular charger having the data for the new battery stored therein.

In the above-noted charger, the degradation state of the power storage device is determined using the secondary battery characteristic data that is measured during charging or diagnosis. However, sufficient degradation determination accuracy may not be obtained only with such measurement data.

SUMMARY OF THE INVENTION

The present invention is therefore made in order to solve such problems. An object of the present invention is to provide a degradation determining apparatus for a power storage device capable of accurately determining a degradation state of a power storage device for driving a vehicle.

Another object of the present invention is to provide a degradation determining method for a power storage device allowing a degradation state of a power storage device for driving a vehicle to be determined accurately.

In accordance with the present invention, a degradation determining apparatus for a power storage device mounted on a vehicle for driving is provided. The vehicle is configured such that electric power can be transferred between the power storage device and a power supply external to the vehicle or an electrical load external to the vehicle. The degradation determining apparatus includes a vehicle identifying unit, first and second evaluation units, and a degradation determining unit. The vehicle identifying unit identifies the vehicle based on an identification number of the vehicle obtained from the vehicle. The first evaluation unit evaluates a degradation state of the power storage device based on use history of the power storage device mounted on the vehicle, using data analyzed beforehand concerning a relation between the use history and the degradation state of the power storage device mounted on the vehicle corresponding to the identification number obtained by the vehicle identifying unit. The second evaluation unit evaluates a degradation state of the power storage device, using data collected when electric power is transferred between the power storage device mounted on the vehicle and the power supply or the electrical load external to the vehicle. The degradation determining unit determines a degradation state of the power storage device based on the degradation state evaluated by the first evaluation unit and the degradation state evaluated by the second evaluation unit.

Preferably, the degradation determining apparatus is provided for a power cable connecting the vehicle with the power supply or the electrical load external to the vehicle. The vehicle identifying unit obtains the identification number from the vehicle when the power cable is connected to the vehicle.

Preferably, when the identification number is obtained by the vehicle identifying unit, the data analyzed beforehand for the power storage device mounted on the vehicle corresponding to the identification number is obtained from a server via a data communication network.

In accordance with the present invention, a degradation determining method for a power storage device mounted on a vehicle for driving is also provided. The vehicle is configured such that electric power can be transferred between the power storage device and a power supply external to the vehicle or an electrical load external to the vehicle. The degradation determining method includes: a step of identifying the vehicle based on an identification number of the vehicle obtained from the vehicle; a first evaluation step of evaluating a degradation state of the power storage device based on use history of the power storage device mounted on the vehicle, using data analyzed beforehand concerning a relation between the use history and the degradation state of the power storage device mounted on the vehicle corresponding to the obtained identification number; a second evaluation step of evaluating a degradation state of the power storage device, using data collected when electric power is transferred between the power storage device mounted on the vehicle and the power supply or the electrical load external to the vehicle; and a step of determining a degradation state of the power storage device based on the degradation state evaluated in the first evaluation step and the degradation state evaluated in the second evaluation step.

Preferably, when a power cable connecting the vehicle with the power supply or the electrical load external to the vehicle is connected to the vehicle, in the step of identifying the vehicle, the identification number is obtained from the vehicle.

Preferably, the degradation determining method further includes a step of obtaining from a server via a data communication network the data analyzed beforehand for the power storage device mounted on the vehicle corresponding to the identification number obtained in the step of identifying the vehicle.

In the present invention, a vehicle is identified based on an identification number of a vehicle obtained from the vehicle.

Then, using data analyzed beforehand concerning the relation between the use history and the degradation state of the power storage device mounted on the vehicle corresponding to the identification number, the degradation state of the power storage device is evaluated based on the use history of the power storage device mounted on the vehicle (first evaluation). Furthermore, using data collected when power is transferred between the power storage device mounted on the vehicle and a power supply or an electrical load external to the vehicle, the degradation state of the power storage device is evaluated (second evaluation). The degradation state of the power storage device is then determined based on the degradation state according to the first evaluation and the degradation state according to the second evaluation.

Therefore, in accordance with the present invention, a degradation state of a power storage device for driving a vehicle can be determined accurately.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 10 is a functional block diagram of a vehicle ECU shown in FIG. 8.

DESCRIPTION OF THE PREFERRED EMBODIMENTS

Figure 1:
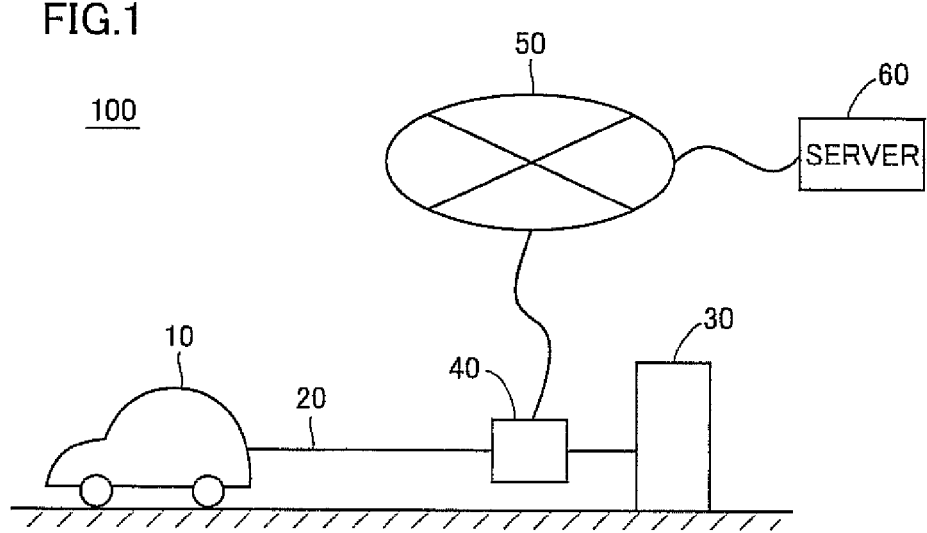
FIG. 1 is an overview diagram of a degradation determining system for a power storage device in accordance with an embodiment of the present invention.

In the following, an embodiment of the present invention will be described in detail with reference to the drawings. It is noted that in the figures the same or corresponding parts are denoted with the same reference characters and a description thereof will not be repeated.

FIG. 1 is an overview diagram of a degradation determining system for a power storage device in accordance with an embodiment of the present invention.

Referring to FIG. 1, a degradation determining system 100 includes a vehicle 10, a power cable 20, a power station 30, a charging/discharging device 40, a data communication network 50, and a server 60.

Vehicle 10 is an electric-powered vehicle equipped with a power storage device and a motor as driving power sources and includes, for example, an electric vehicle, a hybrid vehicle, a fuel cell electric vehicle, or the like. Vehicle 10 can be connected to power station 30 using power cable 20. The power storage device can be charged from power station 30 using charging/discharging device 40 provided for power cable 20, and the power storage device can also supply electric power to power station 30.

Power cable 20 is a power line for electrically connecting power station 30 and vehicle 10 with each other. Power cable 20 is also used as a data communication medium between vehicle 10 and charging/discharging device 40. Power station 30 can supply charging power to vehicle 10 through power cable 20 and can also receive electric power from vehicle 10 to supply electric power to a system power supply or a variety of loads.

Charging/discharging device 40 is provided for power cable 20. Charging/discharging device 40 controls electric power fed from power station 30 to vehicle 10 when the power storage device of vehicle 10 is charged from power station 30. In addition, charging/discharging device 40 controls electric power fed from vehicle 10 to power station 30 when electric power is fed from vehicle 10 to power station 30.

Furthermore, when power cable 20 is connected to vehicle 10, charging/discharging device 40 obtains an identification number of vehicle 10 from vehicle 10 through power cable 20 and identifies vehicle 10 based on the obtained identification number. Then, charging/discharging device 40 determines a degradation state of the power storage device mounted on vehicle 10 corresponding to the obtained identification number through a method as described later.

Charging/discharging device 40 is connected to data communication network 50 and can communicate with server 60 via data communication network 50. Then, when determining a degradation state of the power storage device mounted on vehicle 10, charging/discharging device 40 obtains analysis data for use in determination of a degradation state of the power storage device mounted on vehicle 10, from server 60 through data communication network 50.

Data communication network 50 is, for example, the Internet. Server 60 is connected to data communication network 50 and can communicate with charging/discharging device 40 via data communication network 50. Server 60 stores data analyzed beforehand concerning the relation between the use history and the degradation state of the power storage device and transmits the analysis data of the power storage device mounted on vehicle 10 to charging/discharging device 40 via data communication network 50 in response to a request from charging/discharging device 40 in degradation determination of the power storage device mounted on vehicle 10.

The analysis data of the power storage device is, more specifically, data obtained as a result of analyzing the relation between the use history (travel distance, operating time, or the like) and the degradation state of a power storage device that is a non-defective product among the power storage devices collected by the manufacturer or the like.

Figure 2:
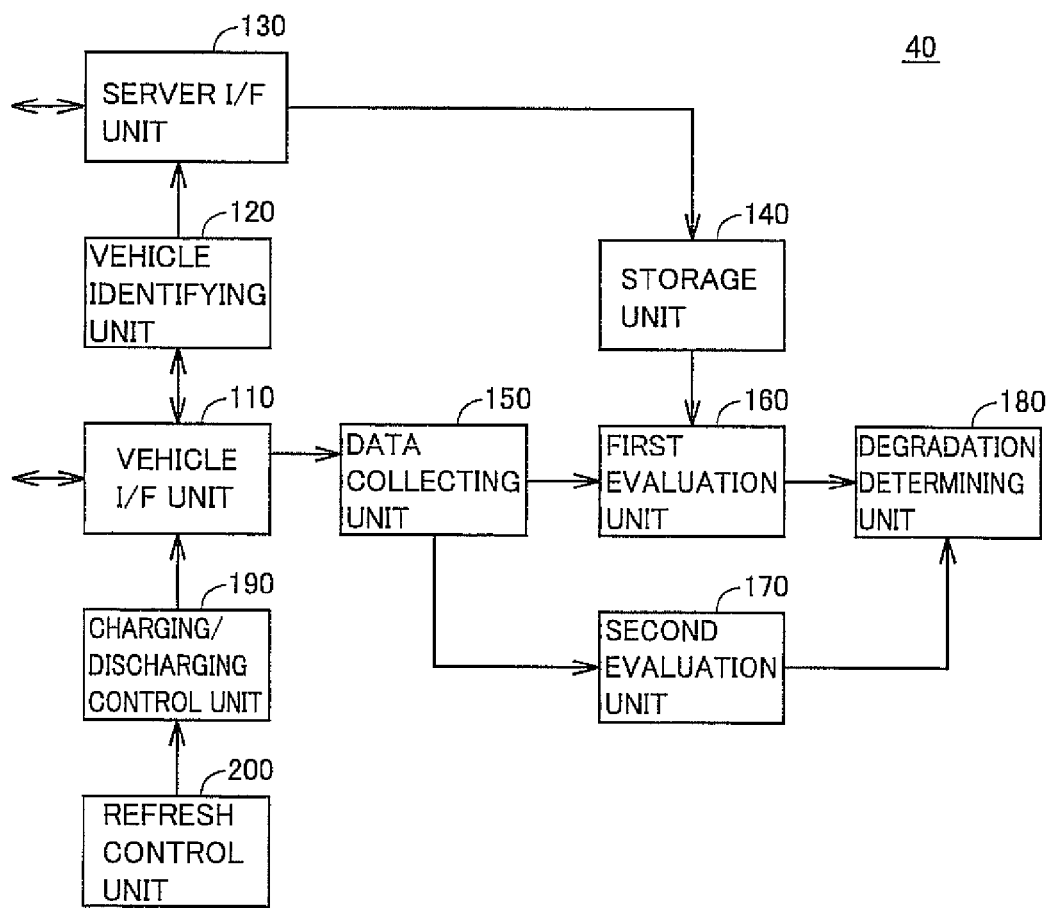
FIG. 2 is a functional block diagram of a charging/discharging device shown in FIG. 1.

FIG. 2 is a functional block diagram of charging/discharging device 40 shown in FIG. 1. Referring to FIG. 2, charging/discharging device 40 includes a vehicle interface (I/F) unit 110, a vehicle identifying unit 120, a server I/F unit 130, a storage unit 140, a data collecting unit 150, a first evaluation unit 160, a second evaluation unit 170, a degradation determining unit 180, a charging/discharging control unit 190, and a refresh control unit 200.

Vehicle I/F unit 110 communicates with vehicle 10 through power cable 20. Vehicle I/F unit 110 is formed, for example, of a communication device such as a modem. Vehicle identifying unit 120 obtains an identification number of vehicle 10 from vehicle 10 when power cable 20 is connected to vehicle 10. Vehicle identifying unit 120 then outputs the obtained identification number to server I/F unit 130. Server I/F unit 130 communicates with server 60 via data communication network 50. Server I/F unit 130 transmits the identification number of vehicle 10 received from vehicle identifying unit 120 to server 60 and receives analysis data for degradation state evaluation transmitted from server 60 in response, to output the data to storage unit 140.

When power cable 20 is connected to vehicle 10, data collecting unit 150 obtains from vehicle 10 data concerning the use history of the power storage device mounted on vehicle 10 and outputs the obtained use history data to first evaluation unit 160. When the power storage device of vehicle 10 is charged from power station 30 or when electric power is fed from vehicle 10 to power station 30, data collecting unit 150 collects from vehicle 10 each data of the voltage, current and temperature of the power storage device mounted on vehicle 10 and the current and voltage in power cable 20 and outputs the collected data to second evaluation unit 170.

First evaluation unit 160 reads from storage unit 140 the analysis data obtained from server 60 and receives from data collecting unit 150 the use history data of the power storage device obtained by data collecting unit 150 from vehicle 10. First evaluation unit 160 then uses the analysis data read from storage unit 140 to evaluate the degradation state of the power storage device of vehicle 10 based on the use history data received from data collecting unit 150 (first evaluation). More specifically, first evaluation unit 160 evaluates the degradation state of the power storage device of vehicle 10 based on the data concerning the use history of the power storage device obtained from vehicle 10, using the data analyzed beforehand concerning the relation between the use history and the degradation state of the power storage device mounted on vehicle 10 corresponding to the identification number obtained by vehicle identifying unit 120.

Second evaluation unit 170 receives from data collecting unit 150 data of the power storage device of vehicle 10 collected by data collecting unit 150. Second evaluation unit 170 then uses the collected data received from data collecting unit 150 to evaluate the degradation state of the power storage device of vehicle 10 (second evaluation). More specifically, second evaluation unit 170 evaluates the degradation state of the power storage device of vehicle 10 using the data collected when the power storage device of vehicle 10 is charged from power station 30 or when electric power is fed from vehicle 10 to power station 30. Here, the data collected when the power storage device of vehicle 10 is charged from power station 30 or when electric power is fed from vehicle 10 to power station 30 is used because the environment is stable during charging or power feeding as compared with during vehicle travel and the collected data is also stable.

Degradation determining unit 180 determines the degradation state of the power storage device mounted on vehicle 10, based on the degradation state of the power storage device as evaluated by first evaluation unit 160 (first evaluation) and the degradation state of the power storage device as evaluated by second evaluation unit 170 (second evaluation). For example, degradation determining unit 180 determines the lower one of the first evaluation and the second evaluation as the degradation state of the power storage device. Alternatively, the average between the first evaluation and the second evaluation may be determined as the degradation state of the power storage device, or the first and second evaluations may be weighted as appropriate and averaged.

Charging/discharging control unit 190 outputs a charging execution command for executing charging of the power storage device to vehicle 10 through I/F unit 110 when the power storage device of vehicle 10 is charged from power station 30. Charging/discharging control unit 190 outputs, to vehicle 10 through I/F unit 110, a power feed execution command for executing power feed from vehicle 10 to power station 30 when electric power is fed from vehicle 10 to power station 30.

Refresh control unit 200 performs control for refreshing the power storage device by bringing the power storage device close to the fully charged or fully discharged state for the purpose of recovery from the reduced charging/discharging capacity of the power storage device due to so-called memory effect or degradation due to sulfation. Refresh control unit 200 receives a refresh request for the power storage device to output to charging/discharging control unit 190 a charging/discharging command for bringing the power storage device close to the fully charged or fully discharged state.

Figure 3:
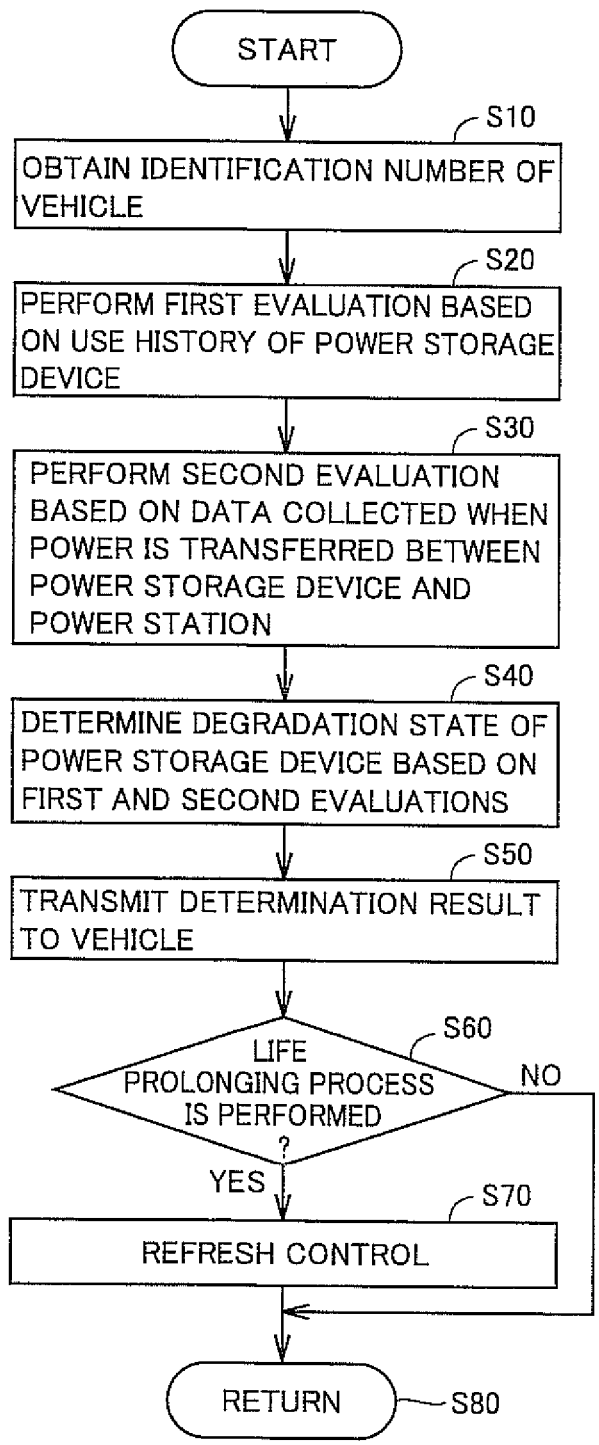
FIG. 3 is a flowchart illustrating a process of determining degradation of a power storage device by the charging/discharging device shown in FIG. 1.

FIG. 3 is a flowchart illustrating a process of determining degradation of the power storage device by charging/discharging device 40 shown in FIG. 1. It is noted that the process in this flowchart is invoked from a main routine for execution at regular time intervals or every time a prescribed condition is met.

Referring to FIG. 3, charging/discharging device 40 obtains the identification number of vehicle 10 from vehicle 10 through power cable 20 (step S10). Then, charging/discharging device 40 evaluates the degradation state of the power storage device mounted on vehicle 10 corresponding to the obtained identification number, based on the use history of the power storage device (first evaluation) (step S20). Charging/discharging device 40 additionally evaluates the degradation state of the power storage device based on the data collected when the power storage device of vehicle 10 is charged from power station 30 or when electric power is fed from vehicle 10 to power station 30 (second evaluation) (step S30).

Charging/discharging device 40 then determines the degradation state of the power storage device mounted on vehicle 10 based on the first evaluation in step S20 and the second evaluation in step S30 (step S40). Charging/discharging device 40 transmits the determination result of the degradation state to vehicle 10 through power cable 20 (step S50). The determination result of the degradation state is displayed for the user in vehicle 10.

The user of the vehicle can determine whether or not to perform a process of prolonging the life of the power storage device, based on the determination result of the degradation state of the power storage device. Charging/discharging device 40 determines whether or not to perform the process of prolonging the life of the power storage device, based on the user's input (step S60). Then, when execution of the life prolonging process is requested from the user (YES in step S60), the refresh control of the power storage device is performed (step S70). The refresh control enables recovery from the reduced charging/discharging capacity of the power storage device due to memory effect or degradation due to sulfation and prolongs the life of the power storage device.

Figure 4:
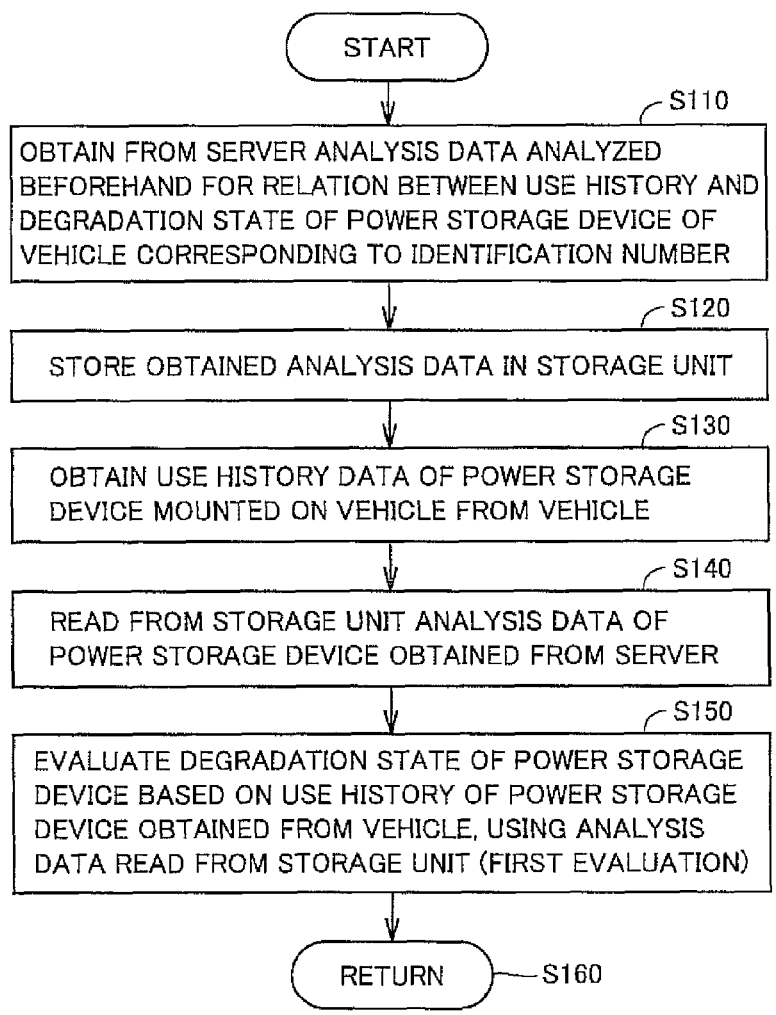
FIG. 4 is a flowchart specifically illustrating a process of first evaluation performed in step S20 in FIG. 3.

FIG. 4 is a flowchart specifically illustrating a process of the first evaluation performed in step S20 in FIG. 3. Referring to FIG. 4, charging/discharging device 40 obtains the analysis data analyzed beforehand concerning the relation between the use history and the degradation state of the power storage device mounted on the vehicle corresponding to the obtained identification number, from server 60 (FIG. 1) via data communication network 50 (step S110). Charging/discharging device 40 then stores the obtained analysis data in the storage unit (step S120).

Then, charging/discharging device 40 obtains from vehicle 10 the data concerning the use history of the power storage device mounted on vehicle 10 connected to power cable 20 (step S130). When the use history data of the power storage device is obtained from vehicle 10, charging/discharging device 40 reads from the storage unit the analysis data of the power storage device obtained from server 60 (step S140).

Charging/discharging device 40 then uses the analysis data read from the storage unit to evaluate the degradation state of the power storage device based on the use history data of the power storage device that is actually obtained from vehicle 10 (first evaluation) (step S150).

Figure 5:
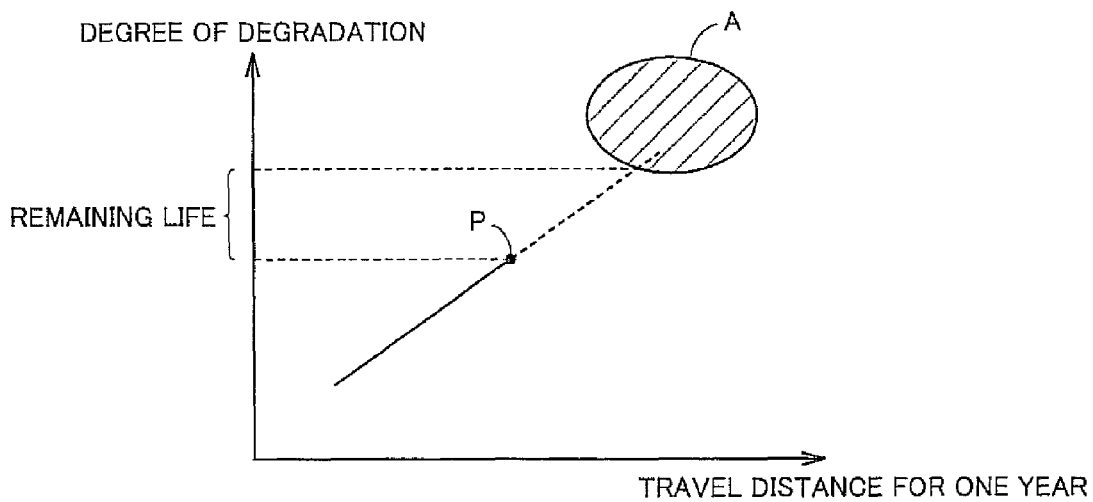
FIG. 5 is a graph showing an example of first evaluation of a power storage device.

FIG. 5 is a graph showing an example of first evaluation of a power storage device. Referring to FIG. 5, the axis of abscissas represents the use history of the power storage device and, in FIG. 5, represents the average travel distance for one year using the power storage device, by way of example. The axis of abscissas may represent a total travel distance using the power storage device or may be a total operating time of the power storage device. The axis of ordinates represents the degradation degree of the power storage device. Region A is a region indicated by the analysis data obtained from server 60 and specifically shows a life region of the power storage device obtained by analyzing a non-defective product among the power storage devices collected by the manufacturer or the like. Point P shows the present degradation state of the power storage device mounted on vehicle 10. As point P is closer to region A, it is evaluated that the power storage device degrades more.

Figure 6:
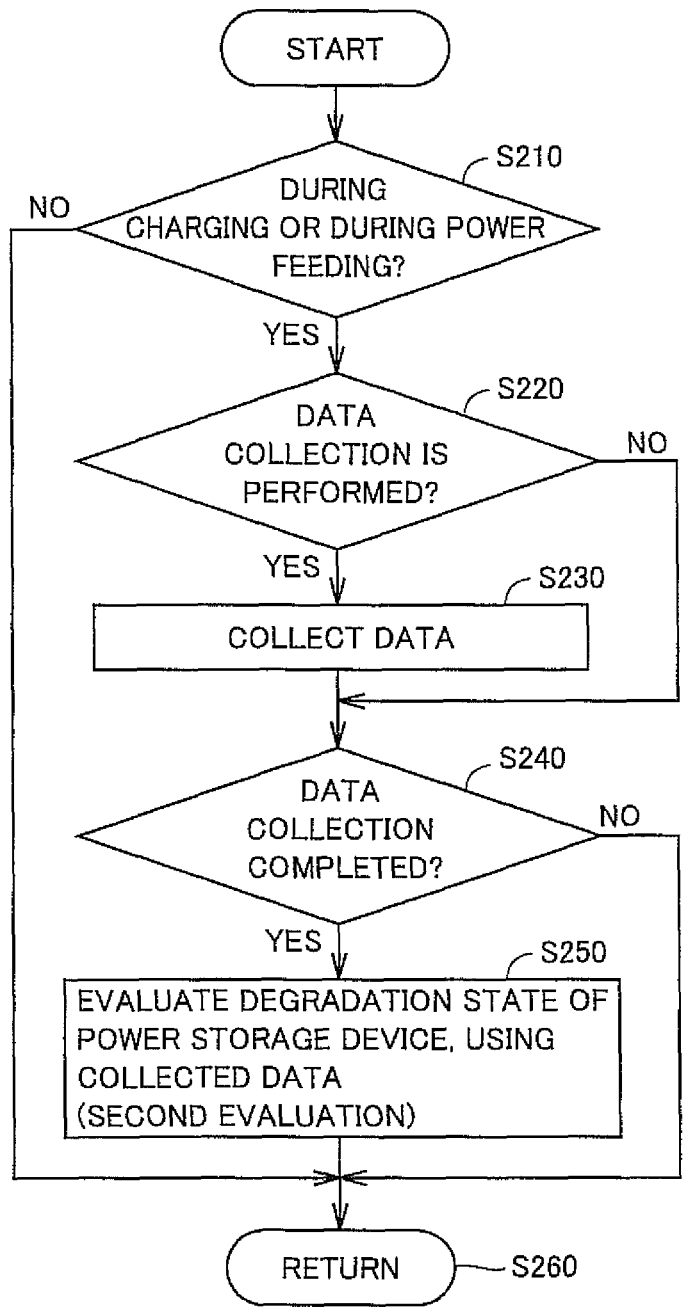
FIG. 6 is a flowchart specifically illustrating a process of second evaluation performed in step S30 in FIG. 3.

FIG. 6 is a flowchart specifically illustrating a process of the second evaluation performed in step S30 in FIG. 3. Referring to FIG. 6, when the power storage device of vehicle 10 is charged from power station 30 or when electric power is fed from vehicle 10 to power station 30 (YES in step S210), charging/discharging device 40 determines whether or not to perform data collection for evaluating the degradation state of the power storage device (step S220).

When it is determined to perform data collection (YES in step S220), charging/discharging device 40 collects each data of the voltage, current and temperature of the power storage device and the current and voltage in power cable 20, from vehicle 10 connected to power cable 20 (step S230). On the other hand, when it is determined not to perform data collection in step S220 (NO in step S220), the process proceeds to step S240.

Thereafter, charging/discharging device 40 determines whether or not data collection has been completed (step S240). When charging/discharging device 40 determines that data collection has not been completed (NO in step S240), the process proceeds to step S260.

When it is determined that data collection has been completed in step S240 (YES in step S240), charging/discharging device 40 uses the data collected in step S230 to evaluate the degradation state of the power storage device mounted on vehicle 10 (second evaluation) (step S250).

Figure 7:
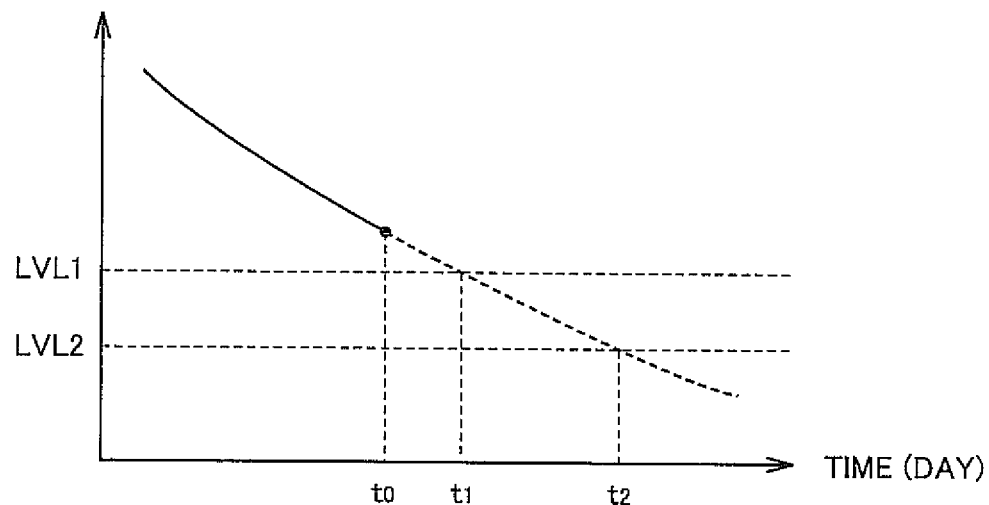
FIG. 7 is a graph showing an example of second evaluation of a power storage device.

FIG. 7 is a graph showing an example of second evaluation of the power storage device. Referring to FIG. 7, the axis of ordinates represents the charging efficiency during charging vehicle 10 from power station 30 and the axis of abscissas represents the time (in days). The solid line shows transition of charging efficiency up to now and the dotted line shows transition of the future charging efficiency predicted based on the transition of charging efficiency in the past. Time t0 corresponds to the present time.

Charging/discharging device 40 calculates the charging efficiency of the power storage device based on the data collected from vehicle 10 and evaluates the degradation state of the power storage device based on the calculated charging efficiency. For example, a first level LVL1 and a second level LVL2 are evaluation levels each showing the degradation state of the power storage device. First level LVL1 indicates that degradation of the power storage device considerably progresses, and second level LVL2 indicates that the power storage device reaches the end of life.

It is noted that another data may be used for the second evaluation in place of the charging efficiency of the power storage device. For example, a secondary battery is generally characterized in that its temperature increases when it reaches the fully charged state and that the temperature increase in the fully charged state becomes large as the degradation proceeds. Therefore, the degradation state of the power storage device can be evaluated by collecting the temperatures of the power storage device when the power storage device reaches the fully charged state and by using the collected temperatures.

Furthermore, the voltage of the power storage device increases as the power storage device is charged. The voltage increasing rate decreases, however, when the degradation of the power storage device proceeds, because resistance loss increases because of increase in internal resistance. Therefore, the degradation state of the power storage device can also be evaluated based on the voltage increasing rate of the power storage device during charging of the power storage device from power station 30.

Figure 8:
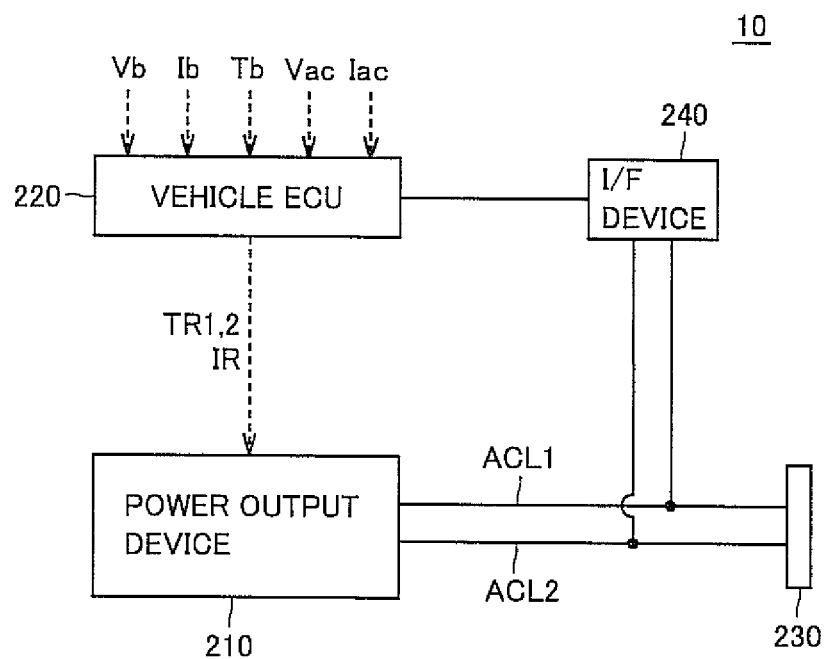
FIG. 8 is a schematic configuration diagram of a vehicle shown in FIG. 1.

A configuration of vehicle 10 shown in FIG. 1 will now be described. FIG. 8 is a schematic configuration diagram of vehicle 10 shown in FIG. 1. Referring to FIG. 8, vehicle 10 includes a power output device 210, a vehicle ECU (Electronic Control Unit) 220, power lines ACL1, ACL2, a connector 230, and an I/F device 240.

Power output device 210 outputs a driving force of vehicle 10. Furthermore, power output device 210 can give/receive electric power to/from power station 30 (FIG. 1) through power cable 20 (FIG. 1) connected to connector 230. A configuration of power output device 210 will be described later. Connector 230 is an electric power interface for electrically connecting power cable 20 to vehicle 10. I/F device 240 is connected to power lines ACL1, ACL2 to communicate with charging/discharging device 40 (FIG. 1) provided for power cable 20 through power lines ACL1, ACL2 and power cable 20. I/F device 240 includes, for example, a communication device such as a modem.

When the operation mode of the vehicle is a travel mode, vehicle ECU 220 generates torque command values TR1, TR2 of a motor generator included in power output device 210 and outputs the generated torque command values TR1, TR2 to power output device 210.

When the operation mode is a charging mode, vehicle ECU 220 generates a current command IR that is a target value of charging current from power station 30 and outputs the generated current command IR to power output device 210. In addition, when the operation mode is a power feeding mode, vehicle ECU 220 generates a current command IR that is a target value of feeding current to power station 30 and outputs the generated current command IR to power output device 210.

Furthermore, when the operation mode is a charging mode or a power feeding mode and when electric power is given/received to/from power station 30, vehicle ECU 220 outputs each detected value of voltage Vb, current Ib and temperature Tb of the power storage device in power output device 210 and current Iac and voltage Vac of power lines ACL1, ACL2 to charging/discharging device 40 through I/F device 240. It is noted that data of each detected value is used to evaluate the degradation state of the power storage device in charging/discharging device 40.

Figure 9:
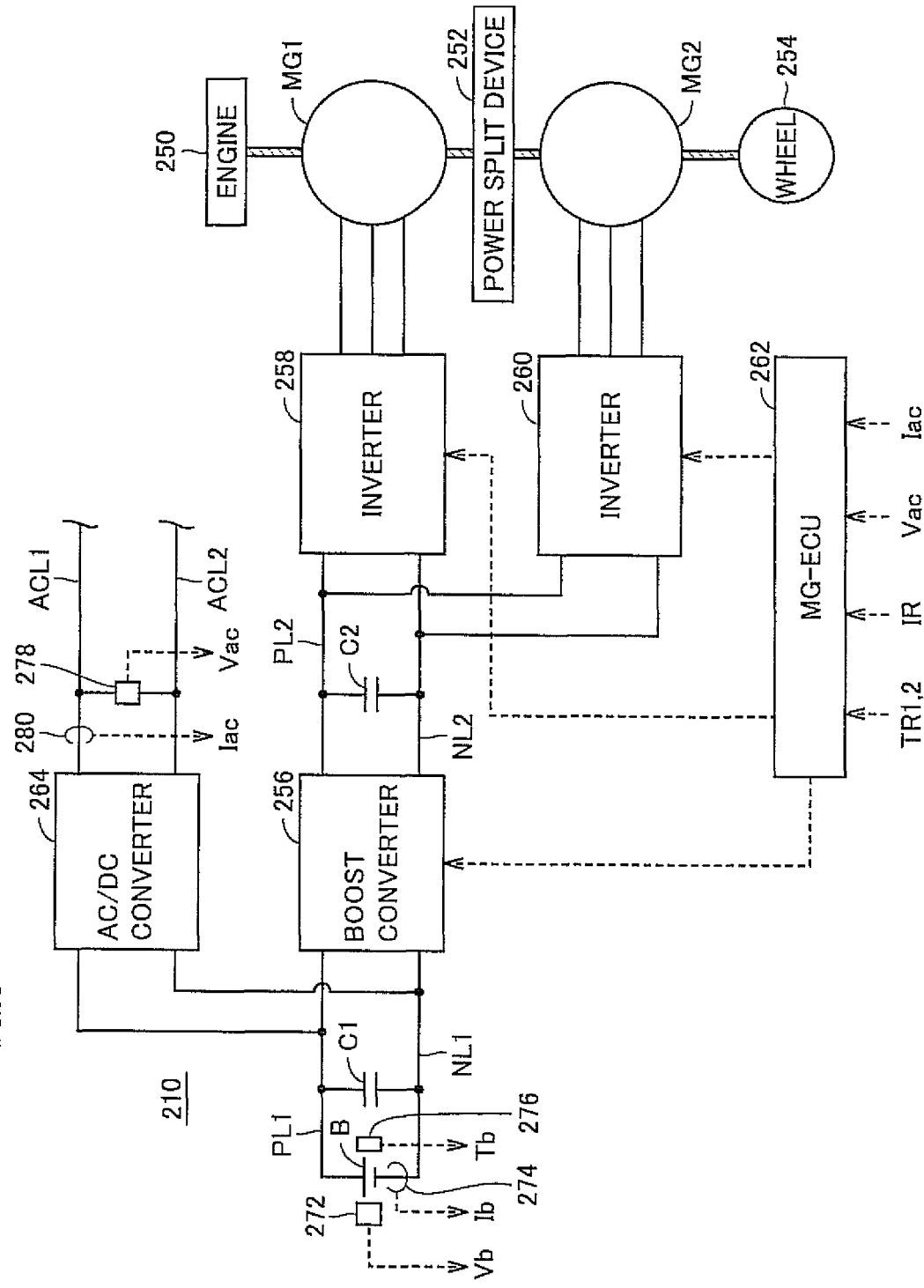
FIG. 9 is a functional block diagram of a power output device shown in FIG. 8.

FIG. 9 is a functional block diagram of power output device 210 shown in FIG. 8. Referring to FIG. 9, power output device 210 includes an engine 250, motor generators MG1, MG2, a power split device 252, and a wheel 254. Power output device 210 further includes a power storage device B, a boost converter 256, inverters 258, 260, an MG-ECU 262, positive electrode lines PL1, PL2, negative electrode lines NL1, NL2, capacitors C1, C2, and an AC/DC converter 264. Power output device 210 further includes voltage sensors 272, 278, current sensors 274, 280, and a temperature sensor 276.

Power split device 252 is coupled to engine 250 and motor generators MG1, MG2 for splitting power between them. A planetary gear having three rotation shafts of a sun gear, a planetary carrier, and a ring gear may be used as power split device 252. Motor generator MG1 is incorporated into power output device 210 to operate as a power generator driven by engine 250 and also operate as an electric motor that may start engine 250. Motor generator MG2 is incorporated into power output device 210 as an electric motor that drives wheel 254 which is a drive wheel.

Power storage device B is a rechargeable DC (direct current) power supply and is formed, for example, of a nickel metal hydride or lithium ion battery. In the travel mode, power storage device B supplies electric power to boost converter 256 and also receives electric power output from boost converter 256 to be charged. In the charging mode, power storage device B receives from AC/DC converter 264 charging power from power station 30 to be charged. In the power feeding mode, power storage device B outputs to AC/DC converter 264 electric power supplied to power station 30.

Capacitor C1 smoothes voltage variations between positive electrode line PL1 and negative electrode line NL1. Boost converter 256 increases the DC voltage received from power storage device B and outputs the increased voltage to positive electrode line PL2. Boost converter 256 also decreases the DC voltage received from inverters 258, 260 through positive electrode line PL2 to the voltage level of power storage device B to charge power storage device B. Boost converter 256 is formed, for example, of a step up/down chopper circuit.

Capacitor C2 smoothes voltage variations between positive electrode line PL2 and negative electrode line NL2. Inverter 258 converts DC voltage received from positive electrode line PL2 into three-phase AC (alternating current) voltage and outputs the converted three-phase AC voltage to motor generator MG1. Inverter 258 also converts three-phase AC voltage generated by motor generator MG1 in response to output of engine 250, into DC voltage, and outputs the converted DC voltage to positive electrode line PL2.

Inverter 260 converts the DC voltage received from positive electrode line PL2 into three-phase AC voltage and outputs the converted three-phase AC voltage to motor generator MG2. Accordingly, motor generator MG2 is driven to generate the designated torque. At a time of braking of the vehicle, inverter 260 converts the three-phase AC voltage generated by motor generator MG2 in response to a rotational force from wheel 254, into DC voltage, and outputs the converted DC voltage to positive electrode line PL2.

Motor generators MG1, MG2 are three-phase AC motors and for example formed of three-phase AC synchronous motors. Motor generator MG1 generates three-phase AC voltage using output of engine 250 and outputs the generated three-phase AC voltage to inverter 258. Motor generator MG1 also generates a driving force using the three-phase AC voltage received from inverter 258 to start engine 250. Motor generator MG2 generates driving torque of the vehicle using the three-phase AC voltage received from inverter 260. At a time of braking of the vehicle, motor generator MG2 generates three-phase AC voltage for output to inverter 260.

AC/DC converter 264 is connected with positive electrode line PL1 and negative electrode line NL1. Then, in the charging mode, AC/DC converter 264 converts charging power (alternating current) from power station 30 as received from power lines ACL1, ACL2, into DC power and outputs the converted DC power to positive electrode line PL1 and negative electrode line NL1 to charge power storage device B. In the power feeding mode, AC/DC converter 264 converts the DC power output from power storage device B into AC power and outputs the converted AC power to power lines ACL1, ACL2 electrically connected with power station 30.

Voltage sensor 272 detects voltage Vb of power storage device B and outputs the detected value to vehicle ECU 220 (FIG. 8). Current sensor 274 detects current Ib input/output to/from power storage device B and outputs the detected value to vehicle ECU 220. Temperature sensor 276 detects temperature Tb of power storage device B and outputs the detected value to vehicle ECU 220. Voltage sensor 278 detects voltage Vac between power lines ACL1 and ACL2 and outputs the detected value to MG-ECU 262 and vehicle ECU 220. Current sensor 280 detects current Iac flowing through power line ACL1 and outputs the detected value to MG-ECU 262 and vehicle ECU 220. It is noted that current sensor 280 may detect current flowing through power line ACL2 for output to MG-ECU 262.

In the travel mode, MG-ECU 262 generates a control signal for driving boost converter 256 and inverters 258, 260, based on torque command values TR1, TR2 from vehicle ECU 220 and outputs the generated control signal to boost converter 256 and inverters 258, 260.

In the charging mode, MG-ECU 262 generates a control signal for driving AC/DC converter 264 to convert charging power (alternating current) from power station 30 as input from power lines ACL1, ACL2, into DC power for charging power storage device B, based on current command IR provided from vehicle ECU 220, and then outputs the generated control signal to AC/DC converter 264.

In the power feeding mode, MG-ECU 262 generates a control signal for driving AC/DC converter 264 to convert DC power output from power storage device B into AC power for output to power lines ACL1, ACL2, based on current command IR provided from vehicle ECU 220, and then outputs the generated control signal to AC/DC converter 264.

FIG. 10 is a functional block diagram of vehicle ECU 220 shown in FIG. 8. Referring to FIG. 10, vehicle ECU 220 includes a data collecting unit 310, a storage unit 320, an I/F unit 330, a vehicle control unit 340, a command generating unit 350, and a display control unit 360.

Data collecting unit 310 collects data concerning the use history of power storage device B. For example, data collecting unit 310 collects data such as the total travel distance or the average travel distance for one year of vehicle 10 driven using power storage device B or the total operating time of power storage device B. Data collecting unit 310 collects each detected value of voltage Vb, current Ib and temperature Tb of power storage device B and current Iac and voltage Vac of power lines ACL1, ACL2 during charging of power storage device B from power station 30 (FIG. 1) or during electric power feeding from power storage device B to power station 30. Data collecting unit 310 then outputs the collected data to storage unit 320.

Storage unit 320 stores the identification number of vehicle 10. Storage unit 320 also stores data collected by data collecting unit 310. Storage unit 320 additionally stores a determination result of degradation state of the power storage device as received from charging/discharging device 40 through I/F unit 330.

When power cable 20 is connected to connector 230 (FIG. 8), I/F unit 330 reads the identification number of vehicle 10 from storage unit 320 and transmits the read identification number to charging/discharging device 40. I/F unit 330 also reads from storage unit 320 data concerning the use history of power storage device B as collected by data collecting unit 310 and transmits the read data to charging/discharging device 40. I/F unit 330 additionally reads from storage unit 320 each data collected by data collecting unit 310 during charging of power storage device B from power station 30 or during electric power feeding from power storage device B to power station 30 and transmits the read data to charging/discharging device 40.

In addition, I/F unit 330 receives from charging/discharging device 40 a charging execution command to designate execution of charging power storage device B from power station 30 or a power feeding execution command to designate execution of electric power feeding from power storage device B to power station 30, and then outputs the received command to command generation unit 350. Furthermore, I/F unit 330 receives the determination result of degradation state of power storage device B from charging/discharging device 40 and then outputs the received determination result to storage unit 320.

Vehicle control unit 340 plays a role in general control of vehicle 10. Vehicle control unit 340 controls the operation modes (travel mode/charging mode/power feeding mode) of the vehicle and also notifies command generating unit 350 of the operation mode.

When the operation mode is the travel mode, command generating unit 350 generates torque command values TR1, TR2 of motor generators MG1, MG2 for output to power output device 210. When the operation mode is the charging mode or the power feeding mode, command generating unit 350 generates current command IR based on the charging execution command or the power feeding execution command received from I/F unit 330 and outputs the generated current command IR to power output device 210.

Display control unit 360 reads the determination result of degradation state of power storage device B from storage unit 320 in response to a display request from a not-shown display and outputs the determination result to the display so that it appears on the display. A car navigation device may be used as such a display.

As described above, in this embodiment, vehicle 10 is identified based on the identification number of the vehicle obtained from vehicle 10 connected to power cable 20. Then, using data analyzed beforehand concerning the relation between the use history and the degradation state of the power storage device mounted on the vehicle corresponding to the identification number, the degradation state of power storage device B is evaluated based on the use history of power storage device B mounted on vehicle 10 (first evaluation). Furthermore, using data collected when electric power is given or received between power storage device B mounted on vehicle 10 and power station 30 external to the vehicle, the degradation state of power storage device B is evaluated (second evaluation). Then, the degradation state of power storage device B is determined based on the degradation state according to the first evaluation and the degradation state according to the second evaluation. Therefore, in accordance with this embodiment, the degradation state of power storage device B for driving the vehicle can be determined accurately.

Although in the foregoing embodiment, a degradation state of a power storage device is evaluated and determined in charging/discharging device 40 provided for power cable 20, vehicle 10 may be provided with this degradation determining function.

Although in the foregoing description, vehicle 10 uses AC/DC converter 264 to give or receive electric power between power storage device B of vehicle 10 and power station 30, a dedicated converter may not be provided. Then, power lines ACL1, ACL2 may be connected to the neutral points of motor generators MG1, MG2, respectively, and the voltage across the neutral points may be adjusted by inverters 258, 260 so that electric power is transferred between power storage device B of vehicle 10 and power station 30.

Although in the foregoing description, vehicle 10 is a hybrid vehicle having an engine and motor generators as driving power sources, the scope of application of the present invention is not limited to hybrid vehicles and includes electric vehicles not equipped with engines, fuel cell electric vehicles having a fuel cell as DC power supply, and the like.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A degradation determining apparatus for a power storage device mounted on a vehicle for driving, said vehicle being configured such that electric power can be transferred between said power storage device and a power supply external to the vehicle or an electrical load external to the vehicle, said degradation determining apparatus comprising:
    a vehicle identifying unit for identifying said vehicle based on an identification number of said vehicle obtained from said vehicle;
    a first evaluation processor for evaluating a degradation state of said power storage device mounted on the vehicle corresponding to the identification number obtained by said vehicle identifying unit based on use history of said power storage device indicated based on a travel distance or running time by said power storage device, using data analyzed beforehand concerning a relation between the use history and the degradation state of said power storage device;
    a second evaluation processor for evaluating a degradation state of said power storage device, using data indicating a charge/discharge state of said power storage device measured when electric power is transferred between said power storage device mounted on said vehicle and said power supply or said electrical load; and
    a degradation determining unit for determining a degradation state of said power storage device based on the degradation state evaluated by said first evaluation unit and the degradation state evaluated by said second evaluation unit.

2. The degradation determining apparatus for a power storage device according to claim 1, wherein
    the degradation determining apparatus is provided for a power cable connecting said vehicle with said power supply or said electrical load, and
    said vehicle identifying unit obtains said identification number from said vehicle when said power cable is connected to said vehicle.

3. The degradation determining apparatus for a power storage device according to claim 1, wherein when said identification number is obtained by said vehicle identifying unit, said data analyzed beforehand for the power storage device mounted on the vehicle corresponding to said identification number is obtained from a server via a data communication network.

4. The degradation determining apparatus for a power storage device according to claim 2, wherein when said identification number is obtained by said vehicle identifying unit, said data analyzed beforehand for the power storage device mounted on the vehicle corresponding to said identification number is obtained from a server via a data communication network.

5. A degradation determining method for a power storage device mounted on a vehicle for driving, said vehicle being configured such that electric power can be transferred between said power storage device and a power supply external to the vehicle or an electrical load external to the vehicle, said method comprising:
- a step of identifying said vehicle based on an identification number of said vehicle obtained from said vehicle;
- a first evaluation step of evaluating a degradation state of said power storage device mounted on the vehicle corresponding to the obtained identification number based on use history of said power storage device indicated based on a travel distance or running time by said power storage device, using data analyzed beforehand concerning a relation between the use history and the degradation state of said power storage device;
- a second evaluation step of evaluating a degradation state of said power storage device, using data indicating a charge/discharge state of said power storage device measured when electric power is transferred between said power storage device mounted on said vehicle and said power supply or said electrical load; and
- a step of determining a degradation state of said power storage device based on the degradation state evaluated in said first evaluation step and the degradation state evaluated in said second evaluation step.

6. The degradation determining method for a power storage device according to claim 5, wherein when a power cable connecting said vehicle with said power supply or said electrical load is connected to said vehicle, in said step of identifying said vehicle, said identification number is obtained from said vehicle.

7. The degradation determining method for a power storage device according to claim 5, further comprising a step of obtaining from a server via a data communication network said data analyzed beforehand for the power storage device mounted on the vehicle corresponding to the identification number obtained in said step of identifying said vehicle.

8. The degradation determining method for a power storage device according to claim 6, further comprising a step of obtaining from a server via a data communication network said data analyzed beforehand for the power storage device mounted on the vehicle corresponding to the identification number obtained in said step of identifying said vehicle.

* * * * *